Figure 5:
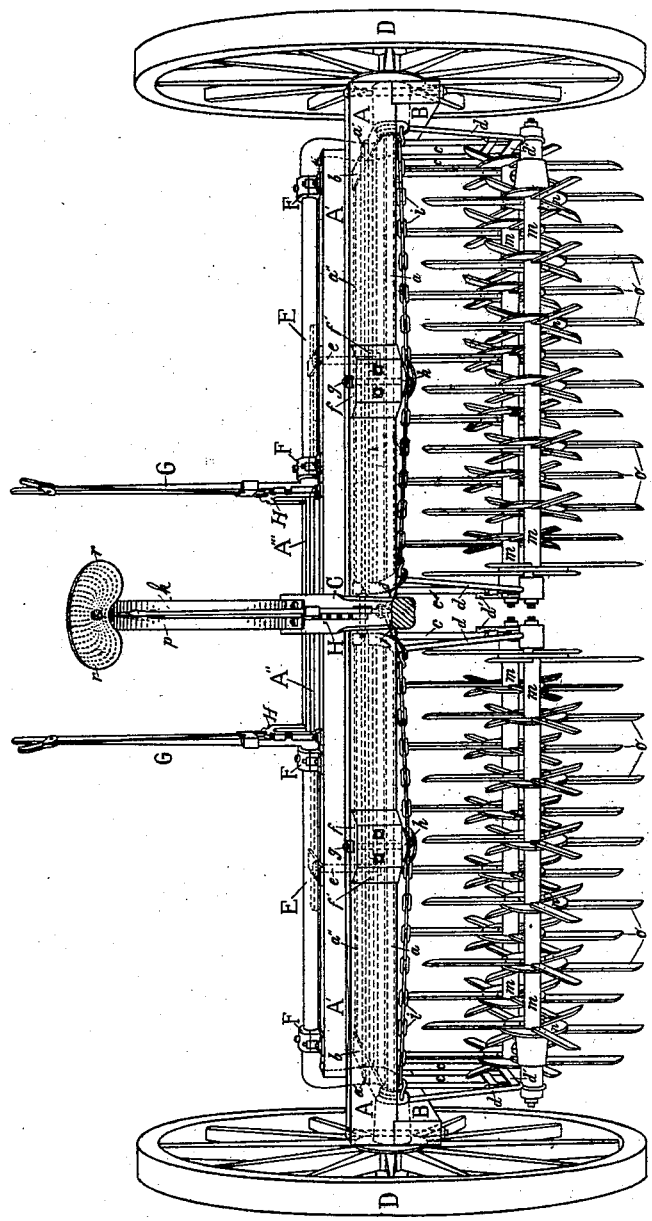

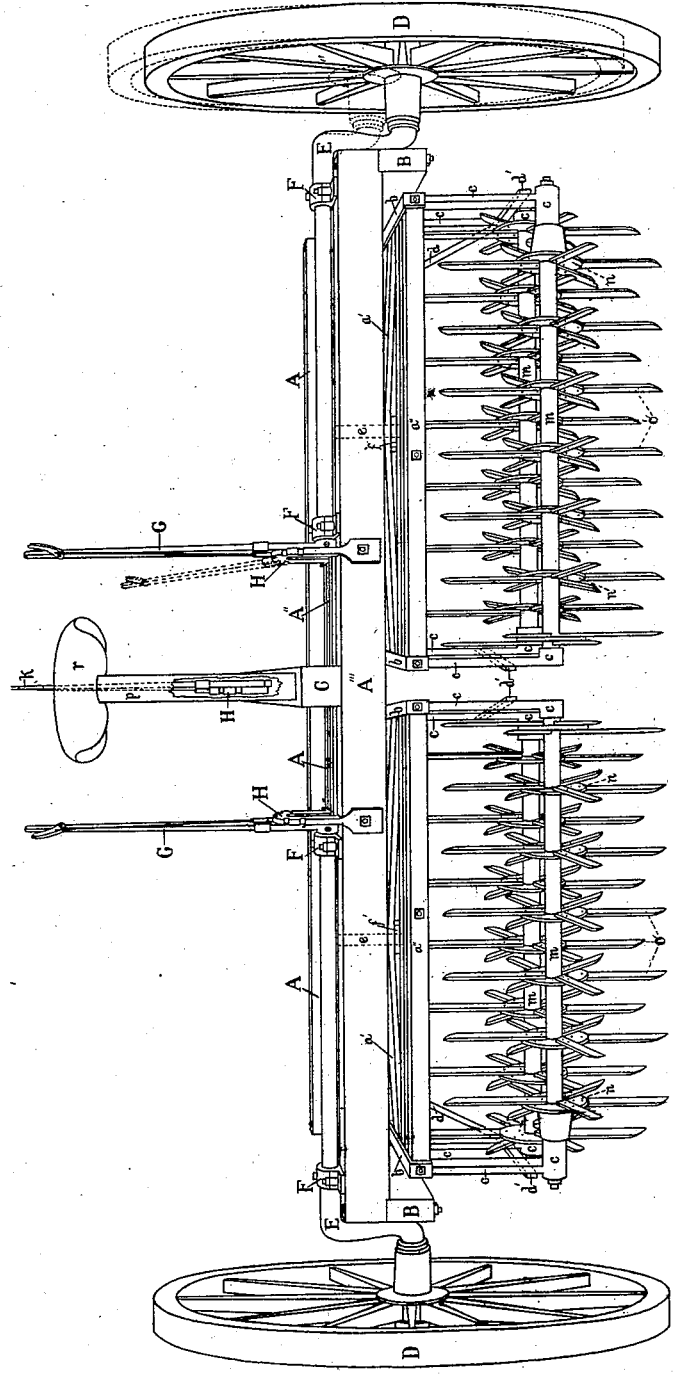

No. 730,980. PATENTED JUNE 16, 1903.
G. A. STEINBACK.
CULTIVATOR.
APPLICATION FILED FEB. 10, 1902.
NO MODEL. 3 SHEETS—SHEET 2.
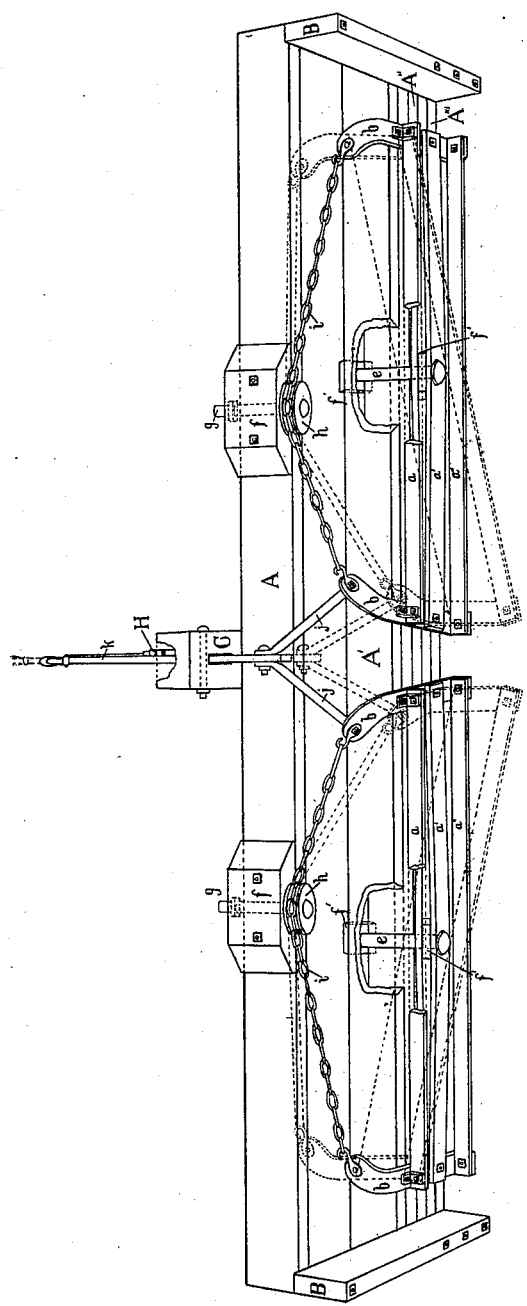
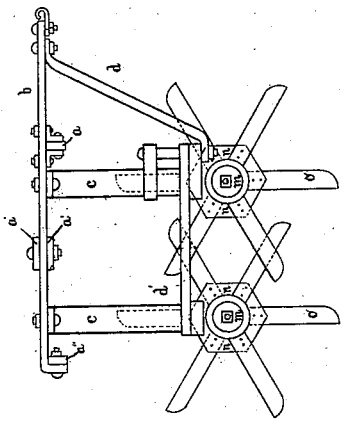
Fig. 4.
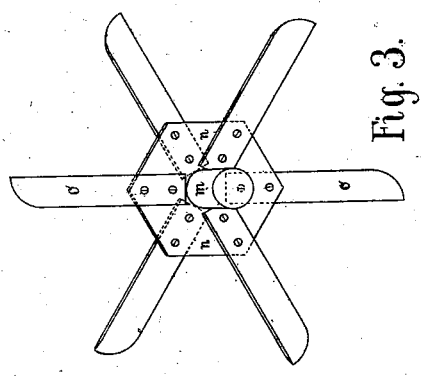
Fig. 3.
WITNESSES
Paul A. Virsen
Alexander Smith
INVENTOR,
Gustof A. Steinback
BY
H. C. Gardiner
ATTORNEY.

No. 730,980. PATENTED JUNE 16, 1903.
G. A. STEINBACK.
CULTIVATOR.
APPLICATION FILED FEB. 10, 1902.
NO MODEL. 3 SHEETS—SHEET 3.

WITNESSES: INVENTOR,
G. A. Steinback,
BY
H. C. Gardiner
ATTORNEY.

No. 730,980.                                              Patented June 16, 1903.

UNITED STATES PATENT OFFICE.

GUSTAF A. STEINBACK, OF ELKPOINT, SOUTH DAKOTA.

CULTIVATOR.

SPECIFICATION forming part of Letters Patent No. 730,980, dated June 16, 1903.

Application filed February 10, 1902. Serial No. 93,396. (No model.)

*To all whom it may concern:*

Be it known that I, GUSTAF A. STEINBACK, a citizen of the United States, residing at Elkpoint, in the county of Union and State of South Dakota, (whose post-office address is Elkpoint, South Dakota,) have invented a new and useful Improvement in Cultivators; and I do declare the following to be a full, clear, and exact description of the same, reference being had to the accompanying drawings, forming a part thereof.

My invention relates to improvements in agricultural machinery; and the object of my invention is to produce a cultivator adapted to pulverize the soil and prepare it for the reception of seed.

My invention consists of a harrow with numerous revolving cultivator-knives secured in a double frame mounted on wheels and can be adjusted to any desired position and made to cultivate the ground to any proper depth or thoroughness.

The invention consists in the novel construction, arrangement, and combination of parts, as will be specifically pointed out in the claim.

In the drawings, Figure 1 is a view of my invention in rear elevation, showing the cultivator-knives in perspective. Fig. 2 is a view in front elevation, showing the frame of the machine in perspective. Fig. 3 is an enlarged detail view of cultivator-knives in side elevation. Fig. 4 is an enlarged detail view showing cultivator-knives in side elevation and means of securing them in the frame. Fig. 5 is a view of my invention in front elevation, the tongue being cut off near the machine.

Referring now to the illustrations, in which like parts are designated by similar letters of reference, the framework or upright of the machine consists of four parallel beams A, A', A'', and A''', secured at each end to the upper surface of the cross-beams B B. The forward beam A is situated at considerable distance from the others, which are secured to the rear portions of the cross-beams at about equal distances from each other. A tongue C, to which the animals are attached, extends at right angles across the upper surface of the parallel beams and is firmly secured thereto in the center of the machine.

The machine is mounted upon two wheels D D, which revolve upon the bent axles E E. The axles are freely secured to the rearmost beam A''' by means of the bearings F F. To the inner ends of said axles are firmly secured the levers G G, which can be secured to the ratchet-bars H H in any desired position by means of the usual rods, springs, and ratchets, which form a part of said levers. These levers are utilized in adjusting the depth of the cultivator-knives in the soil. Thus when the levers are in a perpendicular position and the bent portions of the axles are downward the knives are raised from the ground. If the levers are placed in a horizontal position and the bent parts of the axles are turned forward or backward, as shown by the dotted lines in the right-hand part of Fig. 1, the knives are lowered. There being an axle for each wheel and a lever for each axle, one section of the cultivator may be lowered independently of the other.

The cultivator-knives are formed in two sections, each of which can be operated partly independent of the other. Each section has an independent frame pivotally secured to the principal frame already described. Each independent frame consists of the parallel bars $a$, $a'$, and $a''$, extending in this order from the front to the rear, and the cross-bars $b\ b\ b\ b$, secured to the outer ends of said parallel bars. To each of said cross-bars are secured the standards $c\ c$ in the manner shown in Fig. 4. These standards are adapted to support the axles to which the cultivator-knives are secured, as presently described. They are further secured to the cross-bars by means of the braces $d\ d$ and connected to each other and rendered firmer by the braces $d'\ d'$. The cross-bars $a'\ a'$ being in the center of the cultivator-sections and pivotally secured to the main frame of the machine are made double, embracing both sides of the cross-bars $b\ b$. They are arched on the upper surface, Fig. 1, where they are attached to the frame in order that the cultivator-sections may move freely under the beams of the machine. The cultivator-frames are pivoted to the under side of the main frame by means of the large bolts $e\ e$, which pass through the central parts of the bars $a\ a$ and plates $f'\ f'\ f'\ f'$, which extend from the beam A' to the beam A″ on both the upper and lower surfaces of said beams, being secured firmly thereto. Directly in front of each of said pivots a block ƒ is secured to the beam A, and a bolt g is secured pivotally therein. At the lower end of each of said bolts is secured a pulley-chain h, and a chain i, connecting each pair of cross-bars b b, operates in said pulley and relieves the strain upon the bolt in the center of the frame. To the forward ends of the inner cross-bars, Fig. 2, are secured braces j j. These braces are connected to the lever k, located upon the tongue of the machine and held by means of the usual ratchet and rod. By means of this lever the sections of the cultivator may be turned horizontally at any desired angle and secured in such position while in operation. Thus by thrusting the lever forward the inner ends of the sections are thrown back, as shown by the dotted lines in Fig. 2, and the cultivator-knives operate diagonally with reference to the machine-frame. The knives are then thrown relatively nearer together, and their broad surfaces are brought into resistance with the ground. When the lever is thrown back, the inner ends of the two sections are pushed forward and nearer together, and the ground is cultivated more finely than when the sections are straight.

Extending between the standards c c from end to end of the cultivator-sections are the axles m m, adapted to revolve in suitable bearings at the lower extremities of the standards. The plates n n n, encircling said axles, are firmly secured thereto at regular intervals, and to these plates the cultivator-knives o o o are secured. The knives all point outward from the axle as a common center. For convenience of illustration I have shown two axles for each section, the position of each set of knives alternating on the axles, and have shown six knives secured to each plate; but in practical operation any convenient number of axles may be supplied and any suitable number of knives secured to each plate on the axles. The knives have broad blades and sharpened points and for strength are secured to both sides of the plates in alternation; but one axle in each cultivator-frame, with accompanying knives, may be used; but the use of two or more is preferable, as in their use one set of knives will keep the other set clear of weeds, cornstalks, or other obstructions.

Having described my invention, what I claim as new, and desire to secure by Letters Patent, is—

The cultivator-knives, o, o, o, revolving axles to which said knives are secured, frames supporting said axles in suitable bearings, bolts e, e, and chains i, i, adapted to pivotally support said frames beneath the main frame of the machine, in combination with the main frame, axles and wheels, chain-pulleys secured to said main frame in which said chains operate, and a lever connecting said supporting-frames with said main frame, and adapted for use in guiding said frames, substantially as described.

In testimony whereof I affix my signature in the presence of two witnesses.

GUSTAF A. STEINBACK.

Witnesses:
H. C. GARDINER,
R. F. HENDERSON.